April 15, 1924.
O. LADD
1,490,748
AEROPLANE SAFETY DEVICE
Filed Jan. 19 1922   3 Sheets-Sheet 1
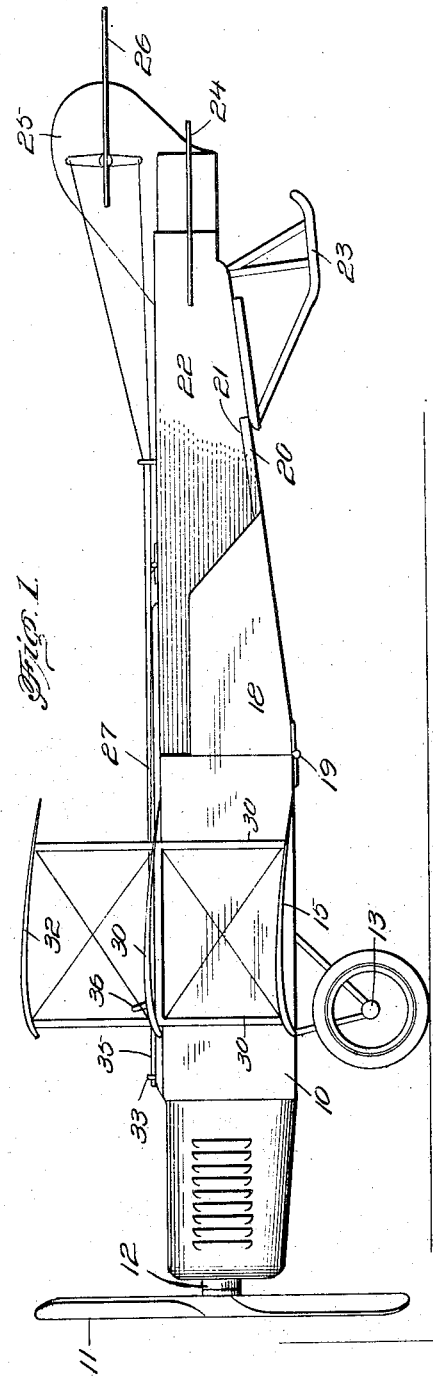
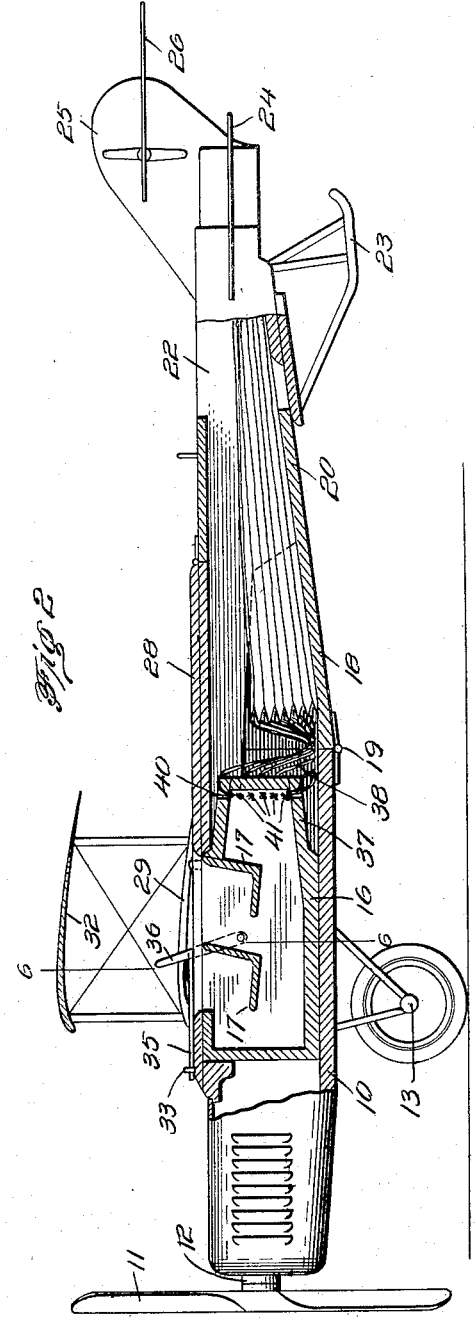
Oliver Ladd. INVENTOR.
BY Geo. F. Kimmel
ATTORNEY.

April 15, 1924.
O. LADD
1,490,748
AEROPLANE SAFETY DEVICE
Filed Jan. 19 1922    3 Sheets-Sheet 2
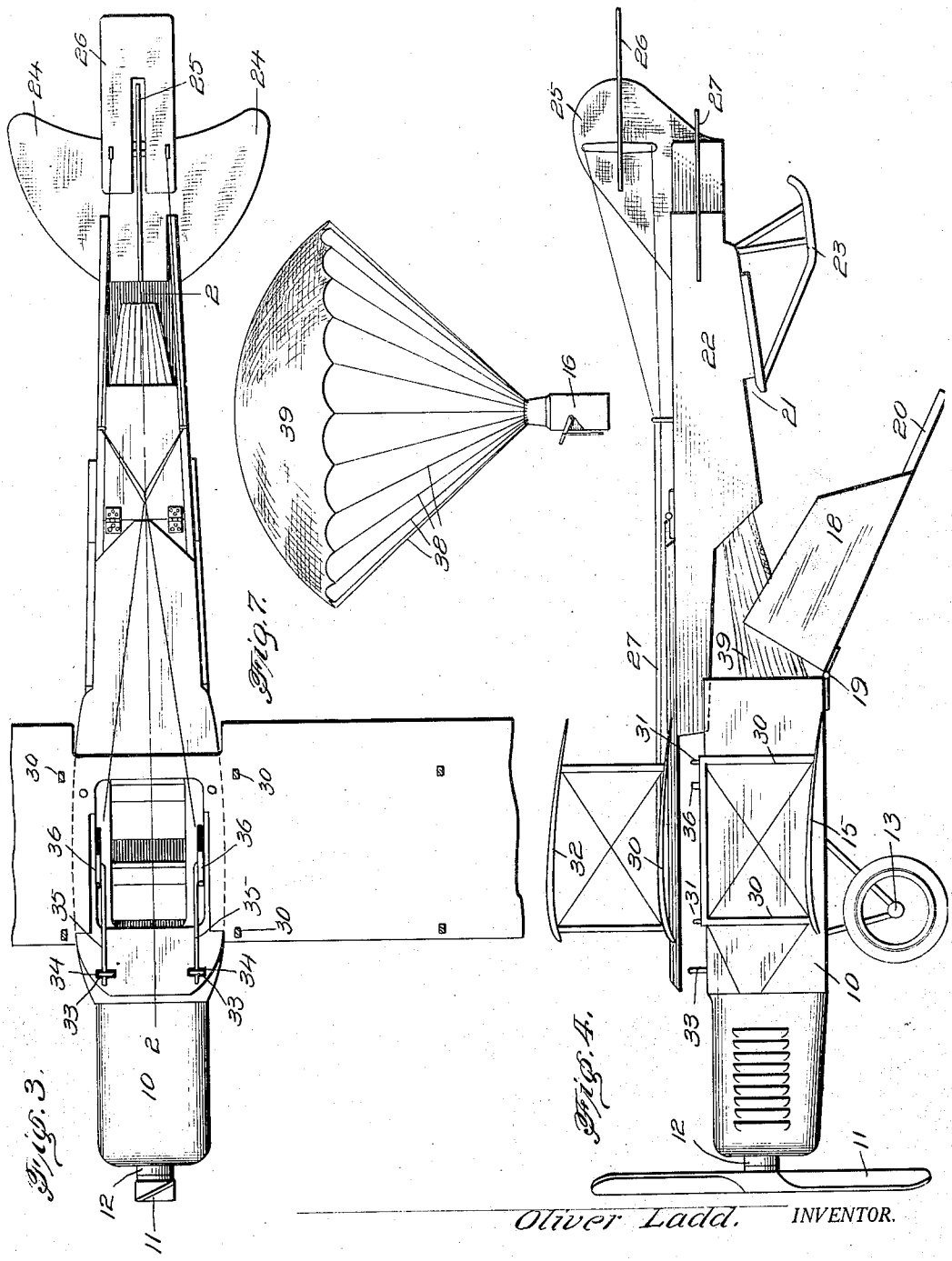
Oliver Ladd.   INVENTOR.
BY Geo. P. Kimmel
ATTORNEY.

April 15, 1924.
O. LADD
1,490,748
AEROPLANE SAFETY DEVICE
Filed Jan. 19 1922   3 Sheets-Sheet 3
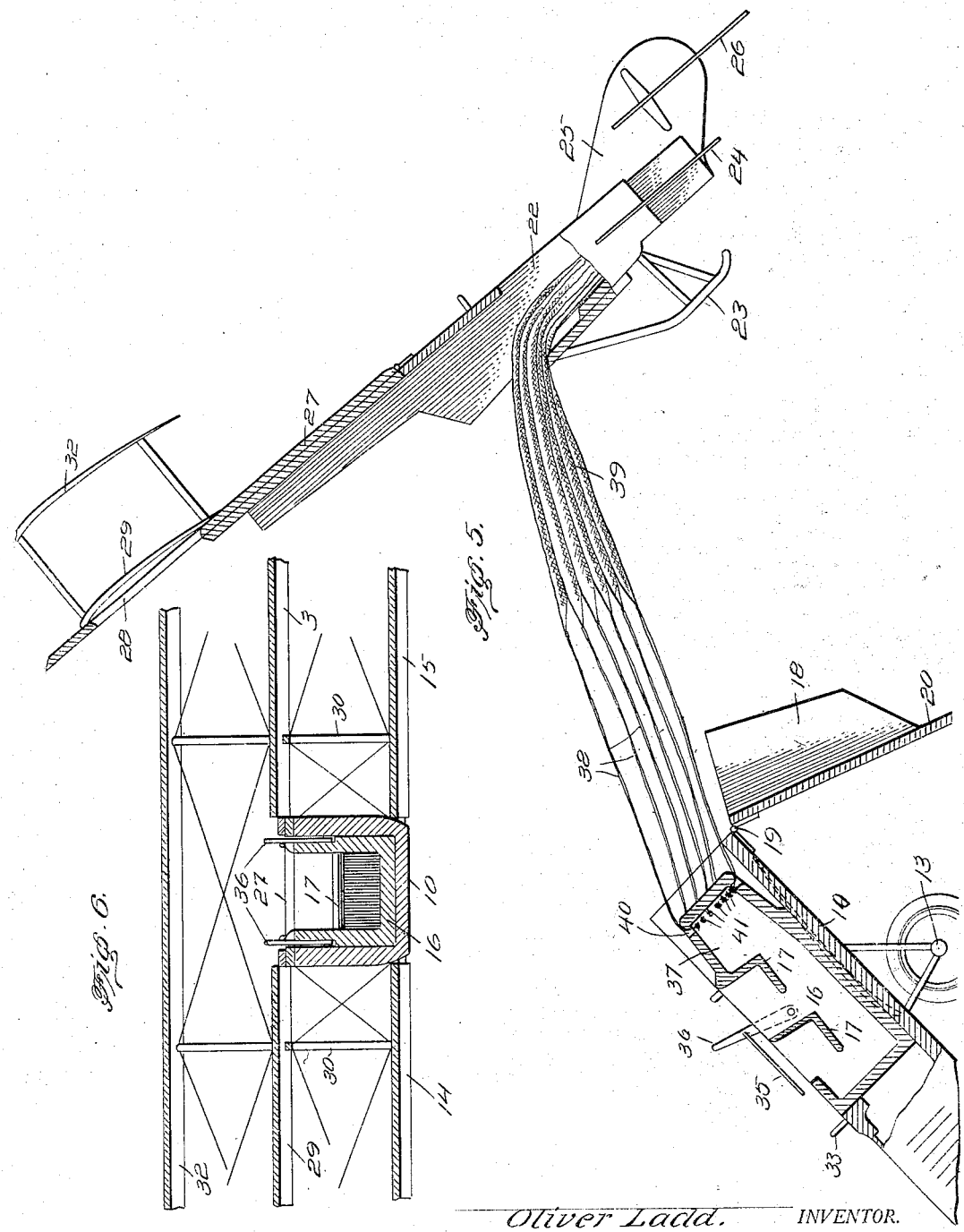
Oliver Ladd.   INVENTOR.
BY
Geo. P. Kimmel.
ATTORNEY.

Patented Apr. 15, 1924.

1,490,748

UNITED STATES PATENT OFFICE.

OLIVER LADD, OF DYERSBURG, TENNESSEE.

AEROPLANE SAFETY DEVICE.

Application filed January 19, 1922. Serial No. 530,369.

*To all whom it may concern:*

Be it known that I, OLIVER LADD, a citizen of the United States, residing at Dyersburg, in the county of Dyer and State of Tennessee, have invented certain new and useful Improvements in Aeroplane Safety Devices, of which the following is a specification.

This invention appertains to improvements in aircraft generally, and more particularly to a safety device or means incorporated within the aircraft whereby to effectively operate to save the lives of the occupants of an aeroplane or the like in case of accident thereto while in flight.

The principal object of the invention is to provide for an aeroplane construction of the class mentioned, and one of a comparatively simple arrangement whereby the parts of the same, in which the occupants are carried, may be readily separated from the remainder thereof and will be landed safely on the ground, in case of accident to the aeroplane for any cause whatever and which renders it necessary that the aeroplane be abandoned.

With the foregoing and other objects in view, the invention resides in the certain new and useful construction and arrangement of parts as will be hereinafter more fully described, set forth in the appended claims, and illustrated in the accompanying drawings, in which:—

Figure 1 is a side elevation of a preferred construction of the aeroplane, and with the safety appliance or device as applied thereto, Fig. 2 is a vertical longitudinal section taken on the line 2—2 of Fig. 3, Fig. 3 is a fragmentary top plan view thereof, Fig. 4 is a side elevation of the aeroplane with the parts thereof as initially separated for the operation of the safety means, Fig. 5 is a fragmentary longitudinal sectional view of the aeroplane with the parts thereof in position for the final separation of the safety means therefrom, Fig. 6 is a fragmentary vertical transverse section taken on the line 6—6 of Fig. 2, and, Fig. 7 is an elevation of the safety means per se, when the same is entirely free from the aeroplane and fully operative.

Referring to the drawings, wherein similar characters of reference designate corresponding parts throughout the several views thereof, the numeral 10 indicates the forward end portion of the fuselage of an aeroplane as constructed and arranged in accordance with the present invention, the same being of a "tractor" type of aeroplane, wherein the aerial screw or propellor 11 is mounted directly on the end of the shaft 12 of the power motor (not shown) projecting outwardly of the front end of the fuselage portion 10. This portion 10 of the fuselage is mounted on a running gear 13, and has extending laterally therefrom a pair of oppositely disposed aerofoils or wing surfaces 14 and 15. This forward end portion 10 of the fuselage is of a length slightly less than that of the total length of the aeroplane and is open at its upper side for a distance inwardly from its rear end to provide a compartment for the reception of a removable cock-pit 16, in which is arranged a pair of seats 17 for the use of the occupants of the aeroplane. The rear end of this portion 10 of the fuselage is also open for direct communication with the interior of an intermediate portion 18, which portion is hinged as at 19 to the rear end of the bottom wall of the portion 10, when both portions are normally disposed one in the plane of the other. The rear end of the bottom wall 20, of the intermediate portion 18 of the fuselage, is projected beyond the side walls thereof, for engagement with an undercut portion 21 formed at the underside of a rear portion 22 of the fuselage. This rear portion 22 of the fuselage is provided at its under side with a ground skid 23, at its opposite sides with usual forms of horizontal stabilizers 24, and at its upper side with a rudder 25, with which is associated an elevator or elevators 26. The upper part of the rear portion 22 of the fuselage extends in a forward direction to overlie the intermediate portion 18 and the major portion of the rear end of the forward portion 10, and this overlying portion is decked over as at 27 to inclose the interiors of the several portions, except for an opening in that portion of the same which overlies the cock-pit 16, such opening being of a sufficient size to admit of the operators of the aeroplane readily entering and leaving the latter when desired.

Extending from the opposite sides of the deck portion 27, to either side of the cockpit opening 28 therein, are a pair of intermediate aerofoils or wing surfaces 29 and 30, which are secured at their inner ends to the deck portion 27, and are otherwise supported on struts 30 rising from the lower pair of aerofoils or wing surfaces 14 and 15, the upper ends of these struts 30 being formed to provide stud-like projections 31 fitting into sockets (not shown) formed in the under sides of the aerofoils or wing surfaces 29 and 30, but otherwise are unconnected with respect thereto. Rising from the intermediate aerofoils or wing surfaces 29 and 30, are a second set of struts 31, which support on their upper ends an upper or third aerofoil or wing surface 32, which overlies the entire and combined length of the intermediate aerofoils or wing surfaces 29 and 30 and that portion of the fuselage 10 interposed therebetween.

The rear portion 22 of the fuselage of the machine or aeroplane, is removably coupled to the intermediate portion 18 thereof, by the engagement of the rearwardly extended portion of the bottom wall 20 of the latter with the undercut portion 21 of the former, and also of the forward end of the deck portion 27 to the forward portion 10 of the fuselage, such latter coupling being accomplished by means of a pair of spaced lugs or eyes 33 being secured in the upper surface of the fuselage portion 10 forwardly of the cock-pit 16 therein, and engaging through slotted openings 34 formed in the extreme end portions of the deck 27, when the eyes or openings of the lugs or eyes 33 are engaged by the forward end portions of a pair of sliding bolts 35, which extend rearwardly to either side of the cock-pit 16 and are pivotally connected to a pair of operating levers 36 disposed in vertical position convenient to the reach of an occupant of one of the seats 17 within the cock-pit 16. These levers 36 are preferably pivoted exteriorly of the opposite sides of the removable cockpit 16, and, when swung in a rearward direction, act to withdraw the engaged ends of the locking bolts 35 from the lugs or eyes 33, whereby to admit of the entire uncoupling and free separation of the parts of the fuselage one from the other, as will be hereinafter more fully explained.

The rear end portion 37 of the removable cock-pit 16 is of a tapered formation and has attached to all four of its side walls and immediately at the extreme rear ends thereof, a plurality of cables or ropes 38. These cables or ropes 38 are one spaced equidistantly from the other, and extend rearwardly through the intermediate portion 18 of the fuselage and connect, also in equidistantly spaced relation, the edge of a parachute 39, which is normally housed within the intermediate fuselage portion 18 and the rear portion 22, substantially as is shown in Fig. 2. As an instance of securing the ends of the cables or ropes 38 to the rear end of the removable cock-pit 16, the side walls of the latter are provided with sets of equidistantly spaced openings 40, and the free ends of the cables or ropes 38 are passed inwardly thereof and are then knotted, as at 41, in a manner to prevent such knotted ends from being withdrawn outwardly of the said openings 40, and by this arrangement of spacing the cables or ropes 38, the same are kept practically free from becoming entangled or otherwise disarranged from desired operative position, either, when disposed within the fuselage during the flight of the aeroplane, or when the parachute 39 is being, or has been, withdrawn from the rear fuselage portion 22 for suspending the cock-pit 16 and gradually lowering the same to the ground.

With the aeroplane constructed, arranged and assembled as hereinbefore described and with the parts of the fuselage coupled together, flight is to be made with the aeroplane as in the usual manner. However, in case of accident to the aeroplane during flight, and the same gets out of control from any cause whatever, or is otherwise in danger of falling to the ground, one of the occupants of the cock-pit 16, will grasp the hand levers 36 and pull the same in a rearward direction, when the bolts 35 will be disengaged from the lugs 33, whereby the heavy forward end portion 10 of the fuselage will, by reason of its greater weight as compared with the other fuselage part, start to drop away from the forward end of the deck portion 27 of the rear portion 22 of the fuselage, and in its fall thereof acts to withdraw the intermediate portion 18 of the fuselage from its engagement with the rear portion 22, when the latter portion, by reason of the effects of the air pressure on the aerofoils or wing surfaces 29, 30 and 32 will tilt in an upward and rearward direction as an aid to the complete separation of the parts of the fuselage, substantially as is shown in Fig. 5. Now, as the parts of the fuselage become entirely separated, the continued fall of the forward portion 10 thereof, together with the cock-pit 16 and the intermediate portion 18, the parachute 39 is withdrawn from the interior of the rear portion 22, and the cock-pit 16 will, since it is entirely unconnected with respect to the fuselage portion 10, and upon the initial opening up of the parachute 39, be withdrawn from the rear end of the said fuselage portion 10. During the continued fall of the cock-pit 16, now entirely free from the fuselage portion 10, the parachute 39 will open to its fullest extent and will sustain the cock-pit 16 and the occupants thereof, the latter being strapped in their seats as is ordinarily done in the operation of aeroplanes, and gradually and finally lower the same to the earth's surface.

From the foregoing, it will be readily apparent that, while a preferred embodiment of the aeroplane and the safety appliance and device therefor has been described and illustrated herein in specific terms and details of construction, arrangement and operation, various changes in and modifications of the same may be resorted to without departing from the spirit of the invention, or the scope of the claims appended hereto.

Having thus fully described the invention, what is claimed as new is:—

1. The combination of an aeroplane fuselage formed to provide separable parts and including a detachable cock-pit, means for detachably securing said parts of the fuselage together, and a parachute extending lengthwise of the fuselage rearwardly of the cock-pit and having its rear end free and its forward end secured to the cock-pit for landing the same, together with the occupants thereof, in safety upon the separation of the parts of the fuselage to release the cock-pit and in the event of the aeroplane getting out of control.

2. The combination of an aeroplane fuselage formed to provide separable parts including a detachable cock-pit, means for detachably securing said parts together, means for actuating said securing means to cause the separation of said parts in the event of the aeroplane getting out of control to release the cock-pit, and a parachute having one end free and its other end connected to said cock-pit for landing the same, together with the occupants thereof, in safety upon the separation of the parts of the fuselage.

3. The combination of an aeroplane fuselage formed to provide separable parts, means for detachably securing said parts together, means for actuating said securing means to cause the separation of said parts in the event of the aeroplane getting out of control, a removable cock-pit carried by the fuselage and separable therefrom, and a parachute removably supported by the fuselage connected to said cock-pit for landing the same, together with the occupants thereof, in safety upon the separation of the parts of the fuselage to release the cock-pit.

4. The combination of an aeroplane fuselage formed to provide transversely separable parts, means for detachably securing said parts together, means for actuating said securing means to admit of the separation of said parts in the event of the aeroplane getting out of control, a cock-pit removably carried in the forward part of the fuselage, and a parachute connected to said cock-pit for landing the same in safety, together with the occupants thereof, upon the separation of the parts of the fuselage, said parachute extending rearwardly from said cock-pit and housed within the fuselage, when not in use and during the normal flight of the aeroplane.

5. The combination of an aeroplane fuselage formed to provide transversely separable parts, means for detachably securing said parts together, a cock-pit removably supported in the forward of said parts, means carried by said cock-pit for actuating said securing means to admit of the separation of said parts in the event of the aeroplane getting out of control, and a parachute connected to said cock-pit for landing the same in safety, together with the occupants thereof, upon the separation of the parts of the fuselage, said parachute extending rearwardly from said cock-pit and housed within the fuselage, when not in use and during the normal flight of the aeroplane.

In testimony whereof, I affix my signature hereto.

OLIVER LADD.